United States Patent
Jo

(10) Patent No.: US 7,450,140 B2
(45) Date of Patent: Nov. 11, 2008

(54) METHOD AND APPARATUS FOR CONTROLLING PRINTING ORDER AND IMAGE FORMING DEVICE USING THE METHOD

(75) Inventor: Gyeong-hun Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 504 days.

(21) Appl. No.: 11/214,899

(22) Filed: Aug. 31, 2005

(65) Prior Publication Data

US 2006/0082828 A1    Apr. 20, 2006

(30) Foreign Application Priority Data

Oct. 18, 2004    (KR) .................. 10-2004-0083233

(51) Int. Cl.
*B41J 2/315* (2006.01)
*B41J 2/32* (2006.01)

(52) U.S. Cl. .................................... 347/172
(58) Field of Classification Search ................ 347/188, 347/190, 194, 180, 182, 172; 400/120.05, 400/120.06, 120.09, 120.1
See application file for complete search history.

(56) References Cited

U.S. PATENT DOCUMENTS 6,106,113 A    8/2000    Yamazaki et al.
6,597,385 B2 *    7/2003    Verdyck ................ 347/171
7,198,419 B2 *    4/2007    Lee ..................... 400/120.16

FOREIGN PATENT DOCUMENTS

| JP | 05-004371 | 1/1993 |
|---|---|---|
| JP | 05-286159 | 11/1993 |
| JP | 08-321963 | 12/1996 |
| JP | 10-278333 | 10/1998 |
| JP | 2000-177161 | 6/2000 |
| KR | 1994-0003298 | 2/1994 |
| KR | 10-2000-0032871 A | 6/2000 |

OTHER PUBLICATIONS

Computer-generated translation of JP 05-286159 cited in the IDS filed on Apr. 18, 2006.*
Computer-generated translation of JP 08-321863 cited in the IDS filed on Apr. 18, 2006.*

* cited by examiner

*Primary Examiner*—Huan H Tran
(74) *Attorney, Agent, or Firm*—Roylance, Abrams, Berdo & Goodman, LLP

(57) ABSTRACT

A system and method of controlling the order of printing by receiving a plurality of images to be printed and calculating a density of each of the images, and determining the order of printing of the images using the calculated density. Since images are printed in the image printing order obtained using the density of the images, the time for cooling the thermal print head which prints by applying heat to media is reduced, such that the total print time for printing the images can be reduced and a uniform print quality can be maintained.

17 Claims, 7 Drawing Sheets

METHOD AND APPARATUS FOR CONTROLLING PRINTING ORDER AND IMAGE FORMING DEVICE USING THE METHOD

CROSS-REFERENCE TO RELATED APPLICATIONS

This application claims the benefit under 35 U.S.C. §119 (a) of Korean Patent Application No. 10-2004-0083233, filed in the Korean Intellectual Property Office on Oct. 18, 2004, the entire disclosure of which is incorporated herein by reference.

FIELD OF THE INVENTION

The present invention relates to a printing method and apparatus. More particularly, the present invention relates to a method and apparatus for controlling the order of printing using the density of a plurality of images to be printed.

DESCRIPTION OF THE RELATED ART

In a typical printing device, text created by a user using an application program or an image photographed using a digital camera is converted to coded data, and the data is output to a sheet of paper in a form that the user can visually recognize. With the recent development of printing technologies, photoprinters that are capable of receiving a plurality of image data and printing images having a quality equivalent to that of a photographically printed picture have become popular.

Thermal transfer type printing devices are one such example of these widely developed devices that are capable of high quality image printing. The thermal transfer type printing device forms an image by applying heat to an ink ribbon contacting media using a thermal print head to transfer ink to the media or to media having an ink layer which reveals a predetermined color by reacting to the heat. In the thermal transfer type printing device, when a plurality of images are to be printed, the device prevents the temperature of the thermal print head from increasing too high. Specifically, when the temperature of the thermal print head exceeds a critical temperature $T_{max}$, the thermal print head is cooled using a cooling fan.

FIG. 1 is a flow chart for illustrating a method of cooling a thermal print head when a plurality of images are printed using a heat transfer type printing device. Referring to FIG. 1, first, a current temperature $T_c$ of the thermal print head is measured at Step 100. It is then determined whether the measured current temperature $T_c$ exceeds a preset critical temperature $T_{max}$ at Step 110. When the measured current temperature $T_c$ does not exceed a preset critical temperature $T_{max}$, an image is printed at Step 120. When the measured current temperature $T_c$ exceeds a preset critical temperature $T_{max}$, the thermal print head is cooled for a predetermined time at Step 130. When an image is completely printed according to the above steps, the steps 100 through 130 are repeated for the remaining images to be printed at Step 140.

As described above, when a plurality of images are consecutively printed using the thermal transfer type printing device, time to cool the thermal print head is needed such that a total print time is prolonged due to the cooling time. Also, when images with high density only are to be printed using an inkjet printer or a laser printer, the print quality of the image is deteriorated.

Accordingly, a need exists for a system and method for printing a plurality of images wherein the impact of cooling time on the total print time and image quality is minimized.

SUMMARY OF THE INVENTION

To solve the above and other problems, the present invention provides a method and apparatus for controlling the order of printing a plurality of images using the density of images to be printed so that the cooling time of the thermal print head needed for printing is reduced to shorten a total print time.

According to an aspect of the present invention, a method of controlling the order of printing is provided and comprises the steps of receiving a plurality of images to be printed and calculating the density of each of the images, and determining the order of printing of the images using the calculated density.

The density of the image is calculated using data values of cyan (C), magenta (M), and yellow (Y) colors of the image. The density of the image can also be calculated using data values of red (R), green (G), and blue (B) colors of the image.

In the step of determining the order of printing, the order of printing of the images is determined such that according to an embodiment of the present invention, the images are printed in the order from an image having a relatively lower density to an image having a relatively higher density.

According to another embodiment of the present invention, the step of determining the order of printing comprises the steps of calculating a temperature of a thermal print head which increases during the printing of the image using the calculated density with respect to each of the images, and determining the order of printing of the images from an image resulting in a relatively lower increased temperature to an image resulting in a relatively higher increased temperature.

According to yet another embodiment of the present invention, the step of determining the order of printing further comprises the steps of calculating a temperature of a thermal print head which increases during the printing of the image using the calculated density with respect to each of the images, calculating a change in the temperature of the thermal print head during the printing of the images in the order of printing using the calculated increased temperature for each image with respect to each of a plurality of printing orders of the images, calculating a cooling time of the thermal print head required during the printing in the order of printing using the calculated change in the temperature of the thermal print head with respect to each of the printing orders, and selecting one of the printing orders which minimizes the calculated cooling time.

According to another aspect of the present invention, a computer-readable recording medium on which a program for executing a method of controlling the order of printing is provided, and comprises a first set of instructions for receiving a plurality of images to be printed and calculating the density of each of the images, and a second set of instructions for determining the order of printing of the images using the calculated density information.

According to another aspect of the present invention, an apparatus for controlling the order of printing is provided and comprises a density analysis portion for receiving a plurality of images to be printed, calculating a density of each of the images and outputting the calculated density, and a control portion for determining the order of printing of the images using the calculated density of the images and outputting information on the order of printing.

According to yet another aspect of the present invention, an apparatus for controlling the order of printing is provided and comprises a data input portion for receiving data of a plurality of images to be printed, a density analysis portion for calculating a density of each of the images, a control portion for determining the order of printing of the images using the calculated density of the images and outputting information on the order of printing, and a printing portion for receiving the printing order information and printing the images in the order of printing.

The apparatus further comprises a memory wherein the image data to be printed and the calculated density of the images are stored.

The printing portion comprises a thermal print head for printing by applying heat to media where an image is to be printed. The thermal print head is configured to rotate to face first and second surfaces of the media.

The density of the image is calculated using data values of cyan (C), magenta (M), and yellow (Y) colors of the image. The density of the image can also be calculated using data values of red (R), green (G), and blue (B) colors of the image.

According to an embodiment of the present invention, the control portion is configured to receive the calculated density of each image and determine the order of printing of the images from an image having a relatively lower density to an image having a relatively higher density.

According to another embodiment of the present invention, the control portion comprises a temperature calculation portion for calculating a temperature of the thermal print head which increases during the image printing using the calculated density with respect to each of the images, and a first order determination portion for receiving an increased temperature for each image, determining the order of printing of the images from an image resulting in a relatively lower increased temperature to an image resulting in a relatively higher increased temperature, and outputting information on the order of printing.

According to yet another embodiment of the present invention, the control portion comprises a temperature calculation portion for calculating a temperature of the thermal print head which increases during the image printing using the calculated density with respect to each of the images, a temperature change calculation portion for calculating a change in the temperature of the thermal print head during the printing of the images in the order of printing using the calculated increased temperature for each image with respect to each of a plurality of printing orders of the images, a time calculation portion for calculating a cooling time of the thermal print head required during the printing of the images in the order of printing using the calculated temperature change with respect to each of the printing orders, and a second order determination portion for receiving the cooling time for each of the printing order combinations, selecting one of the printing orders which minimizes the cooling time of the thermal print head, and outputting information on the order of printing.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF THE EXEMPLARY EMBODIMENTS

Figure 1:
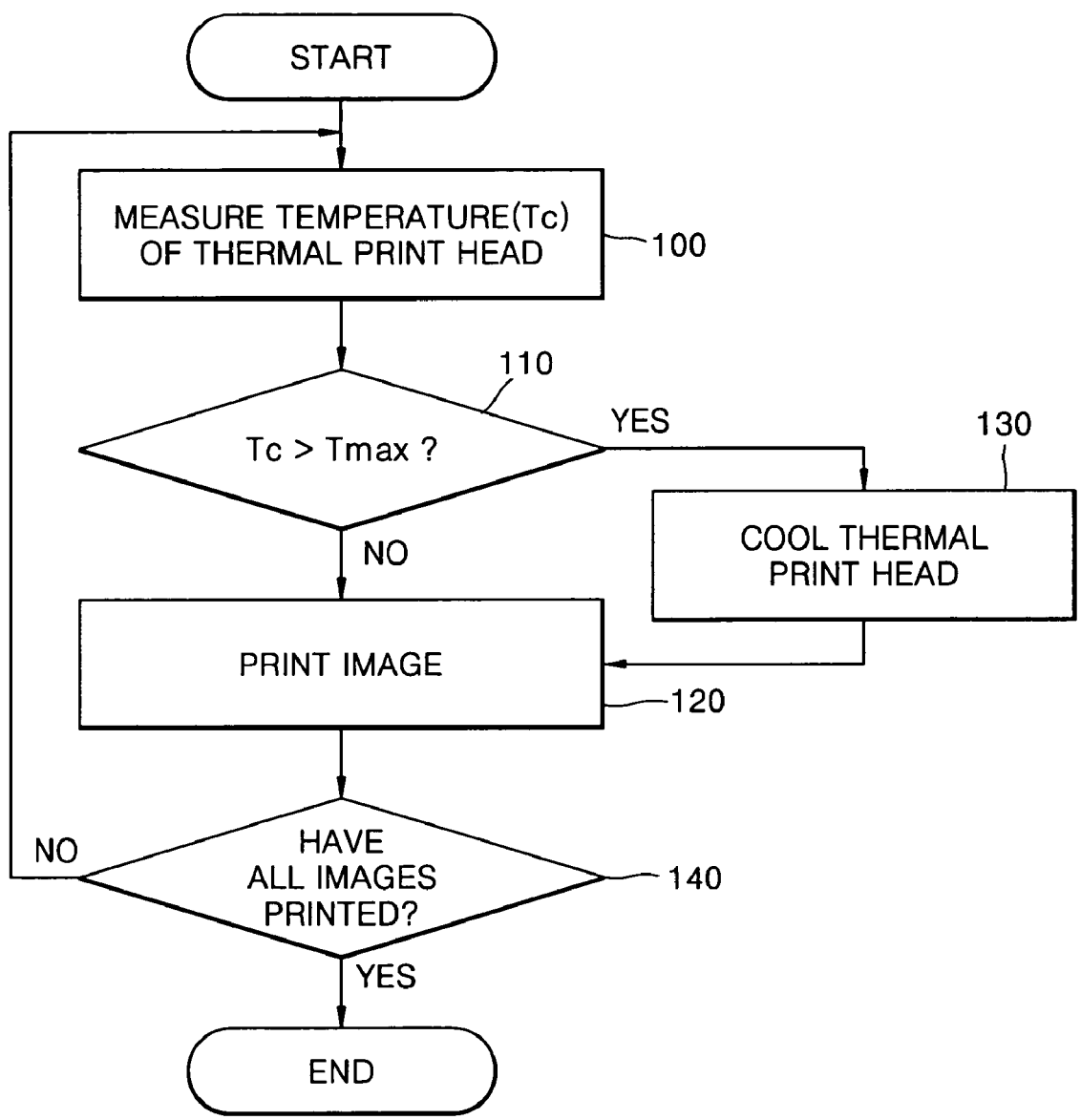
FIG. 1 is a flow chart for illustrating a method of cooling a thermal print head when a plurality of images are printed.
Figure 2A:
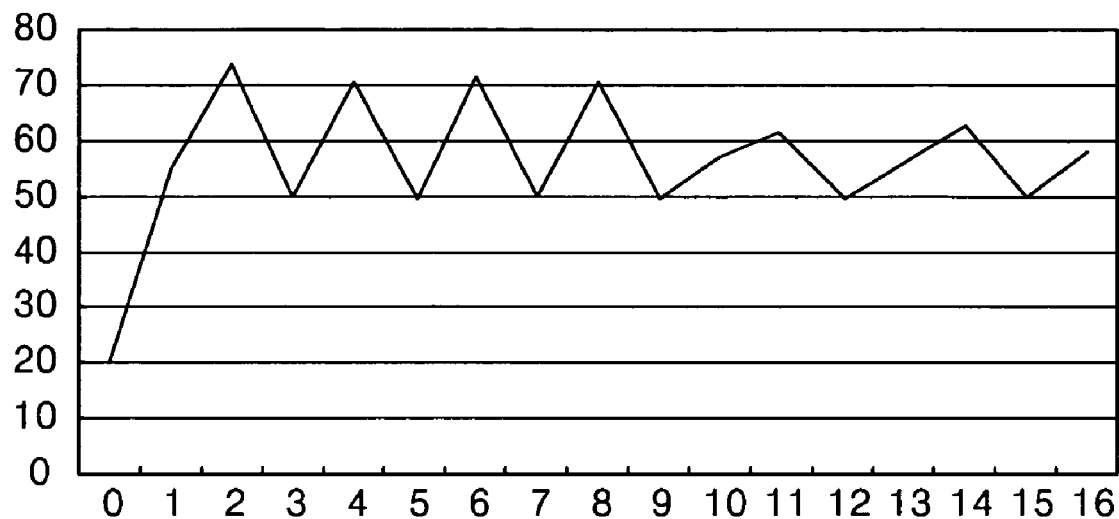
FIGS. 2A and 2B are graphs illustrating a change in the temperature of a thermal print head when a plurality of images are printed.
Figure 2B:
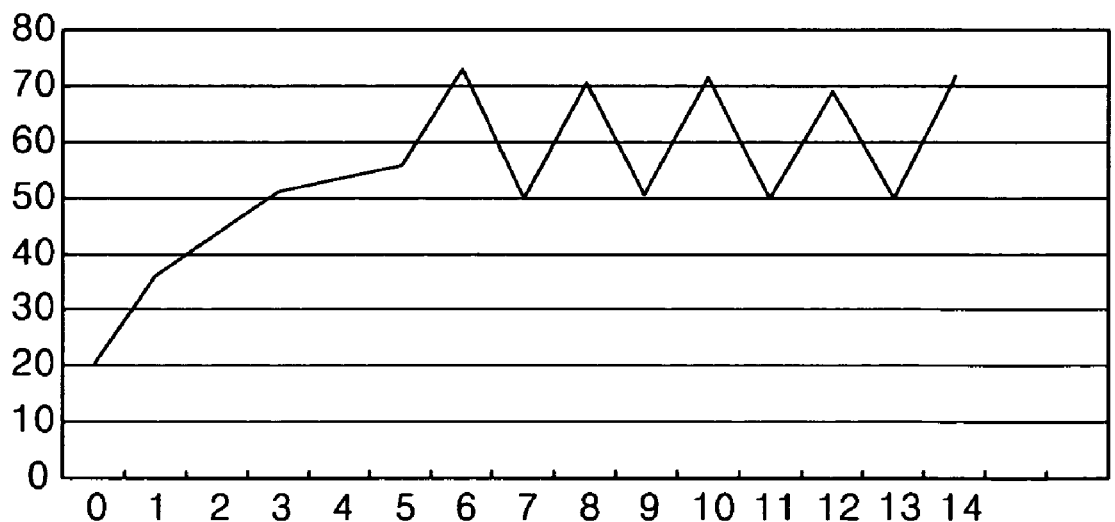

A number of exemplary embodiments of the present invention will now be described. As noted above, when a plurality of images are consecutively printed using the thermal transfer type printing device, time to cool the thermal print head is needed such that a total print time is prolonged due to the cooling time. FIGS. 2A and 2B are graphs illustrating a change in the temperature of a thermal print head when a plurality of images are printed. Specifically, FIGS. 2A and 2B illustrate a case of consecutively printing ten images, in which five images have a relatively higher density so that an increase in the temperature of a thermal print head during printing is large, while the other five images have a relatively lower density so that an increase in the temperature of a thermal print head during printing is small.

In FIG. 2A, the five images having a relatively higher density are printed first, and then the other five images having a relatively lower density are printed. Where a critical temperature $T_{max}$ of the thermal print head is 60° C., the thermal print head needs to be cooled six times to print all of the ten images.

In FIG. 2B, the five images having a relatively lower density are printed first, and then the other five images having a relatively higher density are printed. Where a critical temperature $T_{max}$ of the thermal print head is 60° C., the ten images can all be printed and the thermal print head needs to be cooled only four times. Thus, by calculating the density of the images to be printed and printing the images in order of density from a lower density to a higher density, the cooling time of the thermal print head can be reduced.

Figure 3:
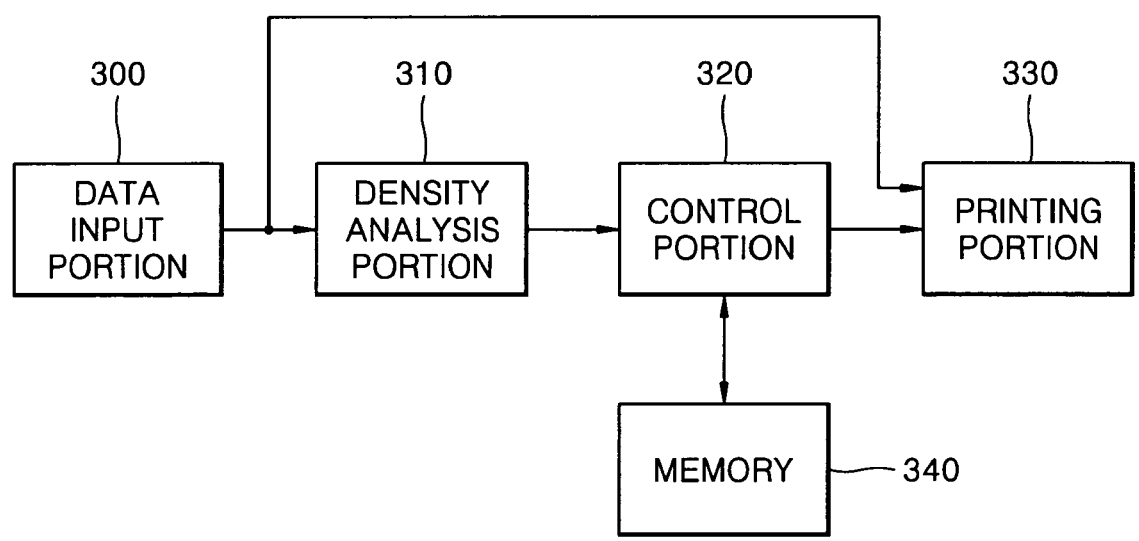
FIG. 3 is a block diagram illustrating a configuration of a printing apparatus according to an embodiment of the present invention.
Figure 6:
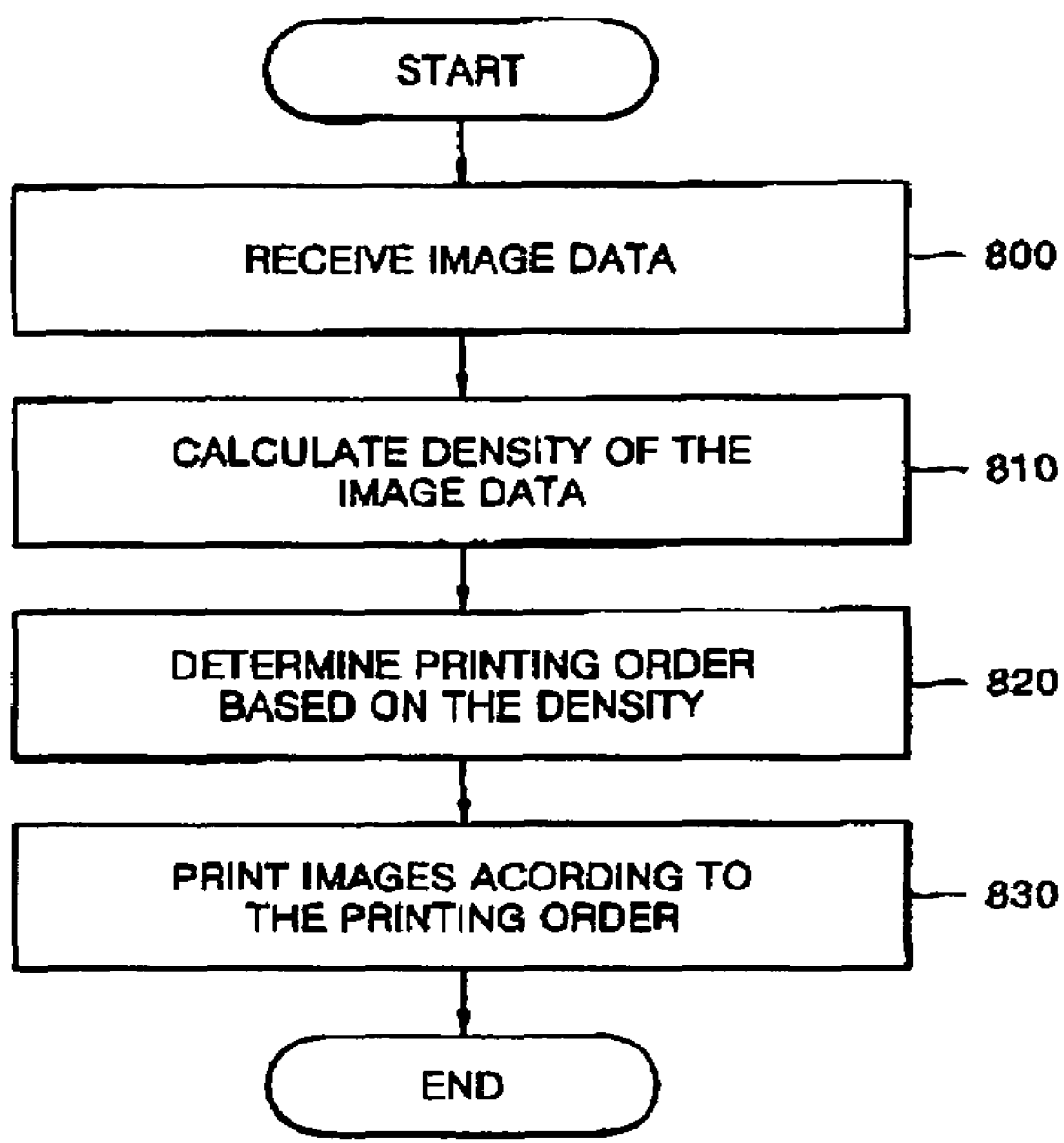
FIG. 6 is a flow chart for illustrating a method of printing according to a first embodiment of the present invention.

FIG. 3 is a block diagram illustrating a configuration of a printing apparatus according to an embodiment of the present invention. Referring to FIG. 3, the printing apparatus comprises a data input portion 300, a density analysis portion 310, a control portion 320, a printing portion 330, and a memory 340. The operation of the printing apparatus of FIG. 3 will be described in greater detail with reference to the flow chart shown in FIG. 6 for illustrating a printing method.

The data input portion 300 receives image data to be printed from a personal computer (PC), digital camera, memory card, or similar device at Step 800. The density analysis portion 310 receives a plurality of image data from the data input portion 300 and calculates the density of each of the images at Step 810. The density of the image can be calculated using cyan (C), magenta (M), and yellow (Y) color data, or red (R), green (G), and blue (B) color data of the image. Specifically, the density of an image can be calculated by adding all of the C, M, and Y color values, or the R, G, and B color values of the dots of the image, and then dividing the added value by the total number of the dots. Alternatively, the density of each of the C, M, and Y colors, or the R, G, and B colors, can be calculated by adding each of the C, M, and Y color values, or the R, G, and B color values of the dots of the image, and then dividing the added value by the total number of the dots.

The control portion 320 stores the image data to be printed and the calculated density of the images in the memory 340. The control portion 320 then determines the order of printing of the images based on the stored density of the images, and outputs information on the order of printing at Step 820. In a first exemplary embodiment of a method of determining the order of printing based on the density of the images, the control portion 320 determines the order of printing from an image having a relatively lower density to an image having a relatively higher density.

Figure 7:
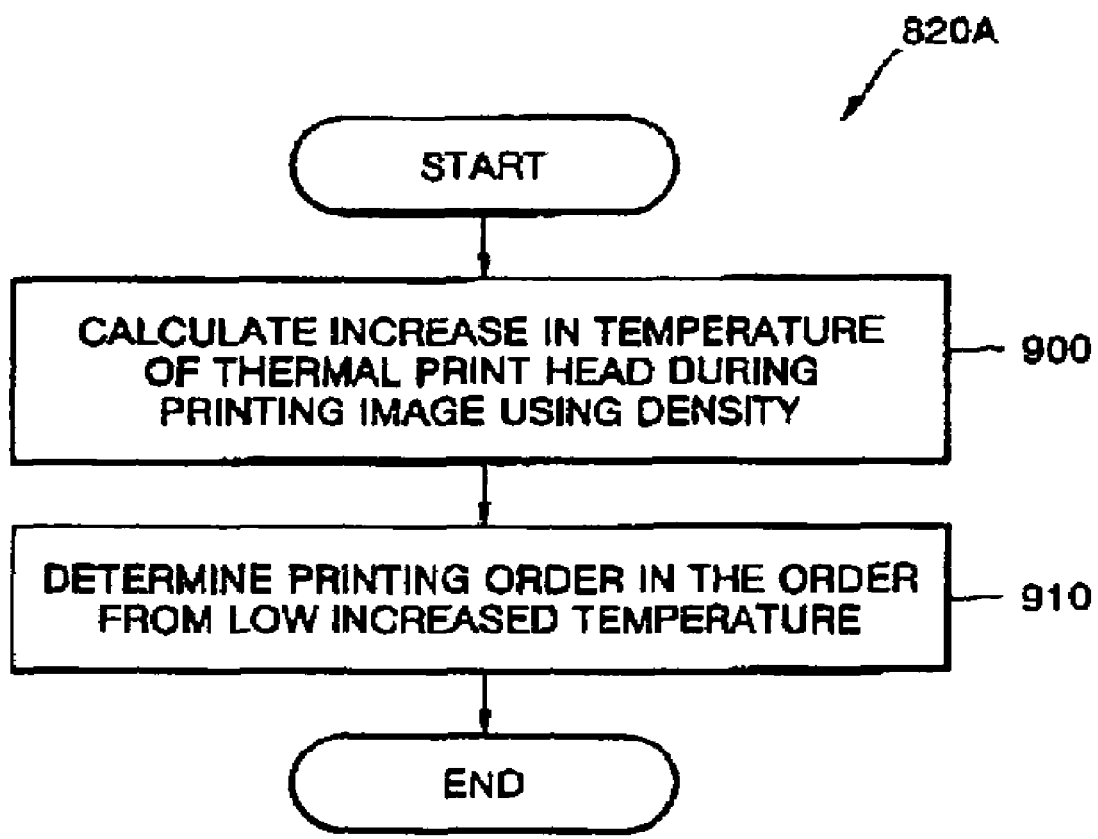
FIG. 7 is a flow chart for illustrating the step 820 of FIG. 6 according to a second embodiment of the present invention.

FIG. 7 is a flow chart 820A for illustrating a second exemplary embodiment of a method of determining the image printing order as performed by the control portion 320.

The control portion 320 first receives the density of the images to be printed and calculates and outputs an increase in the temperature of the thermal print head during the printing of the images using the density of each image at Step 900. In a method of calculating the increased temperature, when the current temperature of the thermal print head is $T_c$, the densities $a_c(T_c)$, $a_m(T_c)$, and $a_y(T_c)$ of the C, M, and Y colors which increase the temperature of the thermal print head by 1° C. are measured through several tests and are stored in advance. Then, when it is desired to calculate the increased temperature of the thermal print head during the printing of images, the current temperature of the thermal print head is measured and the C density $D_c$, M density $D_m$, and Y density $D_y$ of the image are calculated. An increased temperature $\Delta T$ is calculated by Equation 1.

$$\Delta T = D_c/a_c(T_c) + D_m/a_m(T_c) + D_y/a_m(T_c) \quad (1)$$

The method of calculating the increased temperature of the thermal print head using Equation (1) will now be described in greater detail with reference to the images of FIGS. 4 and 5.

Figure 4:
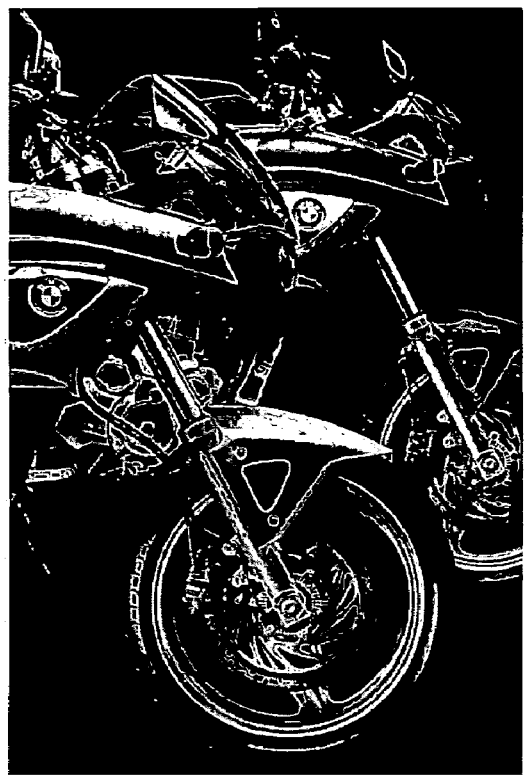
FIG. 4 is a first image to be printed in a printing apparatus according to an embodiment of the present invention.

The image shown in FIG. 4 is an image having a relatively higher density. When the density of each of the C, M, and Y colors of the image are calculated in this example, the densities $D_c$, $D_m$, and $D_y$ are determined to be 38.75 dots/mm², 34.87 dots/mm², and 31.00 dots/mm², respectively. When the C color density $D_c$ of the image at the current temperature $T_c$ is 4.65 dots/mm², the temperature of the thermal print head is measured to increase by 1° C. When the M color density $D_m$ of the image at the current temperature $T_c$ is 9.3 dots/mm², the temperature of the thermal print head is measured to increase by 1° C. When the Y color density $D_y$ of the image at the current temperature $T_c$ is 2.32 dots/mm², the temperature of the thermal print head is measured to increase by 1° C. That is, $a_c(T_c) = 4.65$ dots/mm²° C., $a_m(T_c) = 9.30$ dots/mm²° C., and $a_y(T_c) = 2.32$ dots/mm²° C.

When the increased temperature of the thermal print head during the printing of the image shown in FIG. 4 is calculated by substituting the above values into Equation (1), the increased temperature of the thermal print head is 25.44° C. Thus, the temperature of the thermal print head after the image of FIG. 4 is printed is $T_c + 25.44°$ C.

Figure 5:
FIG. 5 is a second image to be printed in a printing apparatus according to an embodiment of the present invention.

The image shown in FIG. 5 is an image having a relatively lower density. When the density of each of the C, M, and Y colors of the image are calculated in this example, the densities $D_c$, $D_m$, and $D_y$ are 7.75 dots/mm², 3.23 dots/mm², and 2.07 dots/mm², respectively. When the C color density $D_c$ of the image at the current temperature $T_c$ is 4.65 dots/mm², the temperature of the thermal print head is measured to increase by 1° C. When the M color density $D_m$ of the image at the current temperature $T_c$ is 9.3 dots/mm², the temperature of the thermal print head is measured to increase by 1° C. When the Y color density $D_y$ of the image at the current temperature $T_c$ is 2.32 dots/mm², the temperature of the thermal print head is measured to increase by 1° C. That is, $a_c(T_c) = 4.65$ dots/mm²° C., $a_m(T_c) = 9.30$ dots/mm²° C., and $a_y(T_c) = 2.32$ dots/mm²° C.

When the increased temperature of the thermal print head during the printing of the image shown in FIG. 5 is calculated by substituting the above values into Equation (1), the increased temperature of the thermal print head is 2.91° C. Thus, the temperature of the thermal print head after the image of FIG. 5 is printed is $T_c + 2.91°$ C.

The control portion 320 then determines the order of printing from an image resulting in a relatively lower increased temperature to an image resulting in a relatively higher increased temperature, and outputs information on the determined printing order at Step 910.

Figure 8:
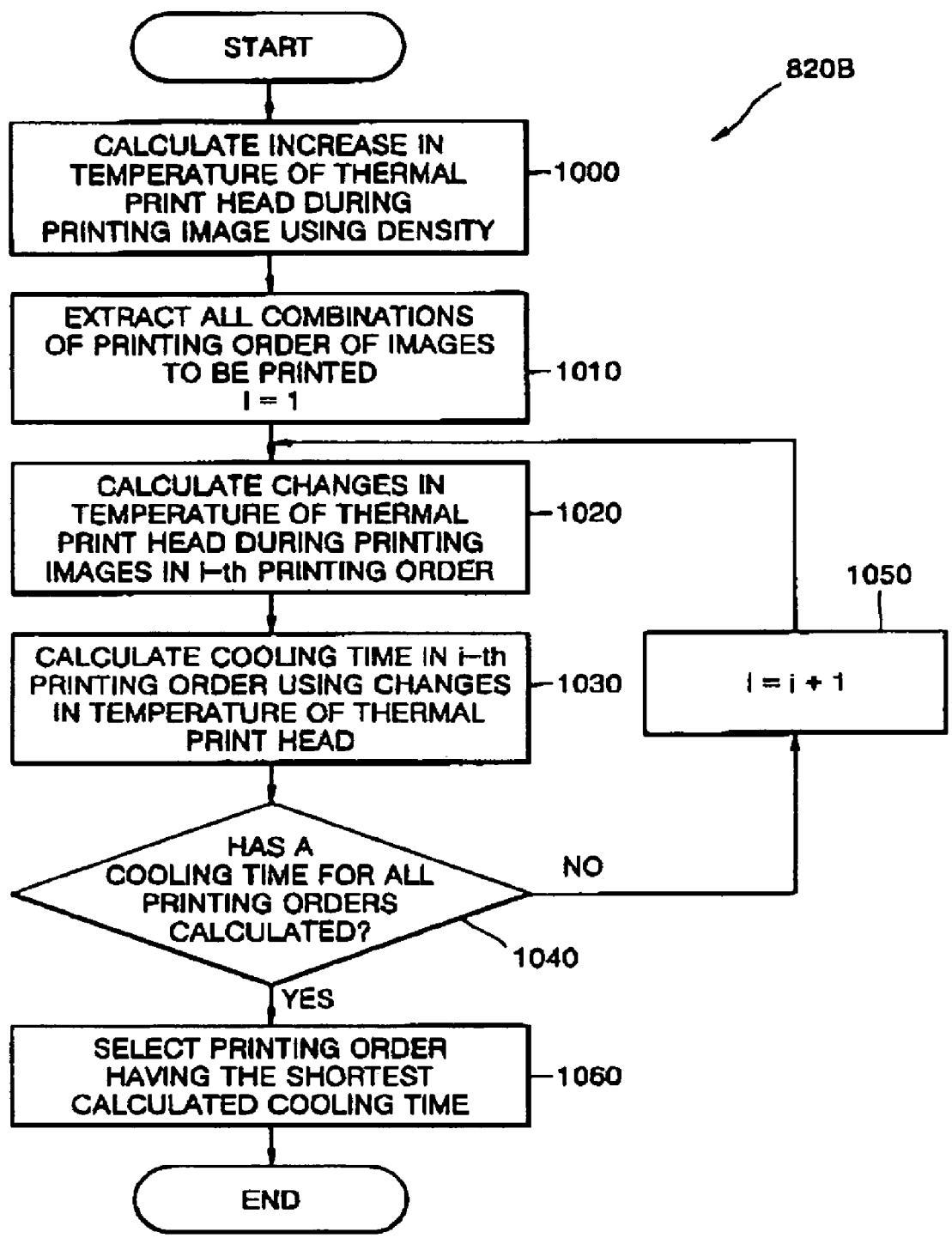
FIG. 8 is a flow chart for illustrating the step 820 of FIG. 6 according to a third embodiment of the present invention.

FIG. 8 is a flow chart 820B for illustrating a third exemplary embodiment of a method of determining the image printing order as performed by the control portion 320.

The control portion 320 first receives the density of an image to be printed and calculates and outputs an increased temperature of the thermal print head during the printing of the image using the density of each image at Step 1000. The increased temperature of the thermal print head during the printing of the image can be determined in a manner substantially as described above for Step 900 of FIG. 7.

The control portion 320 extracts all possible combinations of the printing order of a plurality of images to be printed at Step 1010. For example, when the images to be printed are A, B, and C, there are six possible printing orders comprised of ABC, ACB, BAC, BCA, CAB, and CBA as the possible printing order combinations.

The control portion 320 calculates a change in the temperature of the thermal print head during the printing of the images in the first printing order of the above extracted printing orders using the increased temperature of the thermal print head per each image at Step 1020. For example, when the current temperature of the thermal print head is 20° C. and the increased temperatures of the images A, B, and C are 10° C., 20° C., and 35° C., respectively, the temperature of the thermal print head changes to 30° C., 50° C., and 85° C. when the images are printed in the first printing order of ABC.

The control portion 320 then calculates the cooling time of the thermal print head required during the printing of the images in the first printing order using the calculated change in the temperature of the thermal print head at Step 1030. In an example of Step 1030, when the critical temperature $T_{max}$ of the thermal print head is 60° C., one cooling time of the thermal print head is needed when the images are printed in the above ABC order. Additionally, provided that the time required for cooling the thermal print head is $t_{cool}$, a cooling time equivalent to $t_{cool}$ is required when the images are printed in the above ABC order.

The control portion 320 confirms whether the cooling time has been calculated for all of the extracted printing order combinations at Step 1040, and repeats the steps from Step 1020 to Step 1050 with respect to each printing order until the cooling time of all printing orders is calculated.

When the cooling time required for printing with respect to all of the extracted printing order combinations is calculated, the control portion 320 selects a printing order having the least cooling time of the printing orders, and outputs information on the printing order at Step 1060.

Returning to FIG. 6, the printing portion 330 receives the information on the printing order of the images from the control portion 320 (for example, as determined by the method of Step 820, 820A or 820B), and prints the images according to the printing order at Step 830. The printing portion 330 includes a thermal print head (not shown) for printing an image by applying heat to media where the image is to be printed. The thermal print head can be rotated to face first and second surfaces of the media.

The present invention can also be embodied as computer readable codes on a computer readable recording medium. The computer readable recording medium can be comprised of any number of data storage devices that can store data which can be thereafter read by a computer system. Examples of the computer readable recording medium include a read-only memory (ROM), random-access memory (RAM), CD-ROM, magnetic tape, floppy disk, optical data storage device, and carrier waves (such as data transmission through the Internet). The computer readable recording medium can also be distributed over a network coupled computer system so that the computer readable code can be stored and executed in a distributed fashion. Also, functional programs, codes, and code segments for accomplishing embodiments of the present invention can be easily construed by programmers skilled in the art to which the present invention pertains.

As described above, in the printing method and apparatus according to embodiments of the present invention, since images are printed in an image printing order obtained using the density information of the images, the time for cooling the thermal print head which prints by applying heat to media is reduced, such that the total print time for printing the images can be reduced and a uniform print quality can be maintained.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of controlling the order of printing, comprising the steps of:
   receiving a plurality of images to be printed and calculating a density of each of the images by calculating a density of colors within the images; and
   determining an order of printing of the images using the calculated density.

2. The method of claim 1, further comprising the step of calculating the density of the images using data values of cyan (C), magenta (M), and yellow (Y) colors of the images.

3. The method of claim 1, further comprising the step of calculating the density of the images using data values of red (R), green (G), and blue (B) colors of the images.

4. The method of claim 1, wherein the step of determining the order of printing comprises the step of:
   determining the order of printing of the images such that the images are printed in an order from an image having a relatively lower density to an image having a relatively higher density.

5. The method of claim 1, wherein the step of determining the order of printing comprises the steps of:
   calculating a temperature of a thermal print head which increases during the printing of the image using the calculated density with respect to each of the images; and
   determining an order of printing of the images from an image resulting in a relatively lower increased temperature to an image resulting in a relatively higher increased temperature.

6. The method of claim 1, wherein the step of determining the order of printing comprises the steps of:
   calculating a temperature of a thermal print head which increases during the printing of the image using the calculated density with respect to each of the images;
   calculating a change in the temperature of the thermal print head during the printing of the images in the order of printing using the calculated increased temperature for each image with respect to each of a plurality of printing orders of the images;
   calculating a cooling time of the thermal print head required during the printing in the order of printing using the calculated change in the temperature of the thermal print head with respect to each of the printing orders; and
   selecting one of the printing orders which minimizes the calculated cooling time.

7. A computer-readable recording medium having embodied thereon a computer program for controlling the order of printing, the computer-readable medium comprising:
   a first set of instructions for receiving a plurality of images to be printed and calculating a density of each of the images by calculating a density of colors within the images; and
   a second set of instructions for determining an order of printing of the images using the calculated density.

8. An apparatus for controlling the order of printing, comprising:
   a color density analysis portion for receiving a plurality of images to be printed and calculating a density of each of the images by calculating a density of colors within the images and outputting the calculated density; and
   a control portion for determining an order of printing of the images using the calculated density of the images and outputting information on the order of printing.

9. An apparatus for controlling the order of printing, comprising:
   a data input portion for receiving data of a plurality of images to be printed;
   a color density analysis portion for calculating a density of each of the images by calculating a density of colors within the images;
   a control portion for determining an order of printing of the images using the calculated density of the images and outputting information on the order of printing; and
   a printing portion for receiving the printing order information and printing the images in the order of printing.

10. The apparatus of claim 9, further comprising a memory wherein the image data to be printed and the calculated density of the images are stored.

11. The apparatus of claim 9, wherein the printing portion comprises a thermal print head for printing by applying heat to media where an image is to be printed.

12. The apparatus of claim 11, wherein the thermal print head is configured to rotate to face first and second surfaces of the media.

13. The apparatus of claim 9, wherein the density of each image is calculated using data values of cyan (C), magenta (M), and yellow (Y) colors of the image.

14. The apparatus of claim 9, wherein the density of each image is calculated using data values of red (R), green (G), and blue (B) colors of the image.

15. The apparatus of claim 9, wherein the control portion is configured to receive the calculated density of each image and determine an order of printing of the images from an image having a relatively lower density to an image having a relatively higher density.

16. The apparatus of claim 9, wherein the control portion comprises:
- a temperature calculation portion for calculating a temperature of the thermal print head which increases during the image printing using the calculated density with respect to each of the images; and
- a first order determination portion for receiving an increased temperature for each image, determining an order of printing of the images from an image resulting in a relatively lower increased temperature to an image resulting in a relatively higher increased temperature, and outputting information on the order of printing.

17. The apparatus of claim 9, wherein the control portion comprises:
- a temperature calculation portion for calculating a temperature of the thermal print head which increases during the image printing using the calculated density with respect to each of the images;
- a temperature change calculation portion for calculating a change in the temperature of the thermal print head during the printing of the images in the order of printing using the calculated increased temperature for each image with respect to each of a plurality of printing orders of the images;
- a time calculation portion for calculating a cooling time of the thermal print head required during the printing of the images in the order of printing using the calculated temperature change with respect to each of the printing orders; and
- a second order determination portion for receiving the cooling time for each of the printing order combinations, selecting one of the printing orders which minimizes the cooling time of the thermal print head, and outputting information on the order of printing.

* * * * *